United States Patent [19]

Sanderford, Jr.

[11] Patent Number: 4,684,945

[45] Date of Patent: Aug. 4, 1987

[54] ELECTRONIC LOCK WITH SECURE BACKDOOR ACCESS

[75] Inventor: Hugh B. Sanderford, Jr., New Orleans, La.

[73] Assignee: DDRS, Inc., Metarie, La.

[21] Appl. No.: 733,966

[22] Filed: May 14, 1985

[51] Int. Cl.[4] .......................... E05B 49/00; H04Q 9/00

[52] U.S. Cl. ................................ 340/825.56; 361/172; 70/278

[58] Field of Search ....................... 340/825.56, 825.32, 340/825.31; 361/172; 70/278, 276

[56] References Cited

U.S. PATENT DOCUMENTS

| | | | |
|---|---|---|---|
| 4,148,092 | 4/1979 | Martin | 361/172 |
| 4,347,545 | 8/1982 | Weishaupt et al. | 340/825.32 |
| 4,494,114 | 1/1985 | Kaish | 340/825.31 |
| 4,519,228 | 5/1985 | Sornes | 70/27 |
| 4,568,998 | 2/1986 | Kristy | 340/825.31 |

*Primary Examiner*—Donald J. Yusko

*Attorney, Agent, or Firm*—Guy W. Shoup

[57] ABSTRACT

An electronic safe has a secure housing including a lockable door thereto, a programmable control unit within said housing, a keyboard mounted on an external side of the housing and connected to the control unit, whereby a user can program a selected combination code into the control unit through the keyboard, a motor driven lock bolt for locking the door to the housing upon the programming of a combination code by a user and closing of the door, and a program control for recognizing entry of the selected combination code to open the lock bolt to permit access into the safe. The electronic safe further has a display for displaying the codes entered by the user, and an override device for randomly generating an alternate code and permitting access into the safe upon entry by the user of an override code corresponding to the alternate code. A pull-out component is also provided for altering the alternate code generating program in the event the security of the override code list has been breached.

19 Claims, 12 Drawing Figures

ELECTRONIC LOCK WITH SECURE BACKDOOR ACCESS

BACKGROUND OF THE INVENTION

1. Field of the Invention

This invention relates to electronic lock mechanisms whose access combination is a private key chosen by the intended user.

This invention particularly relates to an electronic safe intended for use in hotel rooms for the protection of personal valuables.

2. Problems of the Prior Art

A problem occurs with such private key systems when the secret combination is forgotten or lost, particularly in the case of high turnover places such as hotels where guests may depart and inadvertently leave their safe closed. It is necessary therefore to have an override system (also known as a trap-door or backdoor access system) whereby the safe can be opened by authorized personnel even though the private combination which was entered by the guest is not known.

However, security is compromised when a backdoor access code falls into the wrong hands.

SUMMARY OF THE INVENTION

It is an object of the invention to provide a backdoor access system which does not compromise the security of a private-key access system.

A principal object of the invention is to provide a programmable electronic safe which has few moving parts and which is particularly suitable for use in high turnover locations such as hotel rooms, wherein ease of use by hotel room occupants and security against unauthorized access are important factors. In particular, it is a specific object that a current occupant can choose a personal combination code not known to any other person at the time of placing valuables in the safe and then use the selected code to reopen the safe at any time. It is a further object that the electronic access control of the safe permits entry by the user even though the selected combination code is lost, without allowing another person to have possession of a global override code (i.e., a master-key code).

In accordance with the present invention, a bypass system is provided within a private-key access system, where the bypass system includes a partial-code generator whose output is accessible, a partial-code convertor whose conversion algorithm is not easily accessible to unauthorized persons, and means for comparing an override-code generated by the partial-code convertor against an override-request code entered by someone seeking to bypass the private-key access path, where the means for comparing causes the lock mechanism to move to its unlocked condition when the override-request code matches the internally contained override-code of the bypass system.

Specifically in accordance with the invention, an electronic safe has a secure housing including a lockable door thereto, a programmable control unit within said housing, a keyboard mounted on an external side of said housing and connected to said control unit, means for programming a selected combination code into said control unit through said keyboard, locking means for locking said door to said housing upon the programming of a combination code by a user and closing of said door to said housing, and means for recognizing entry on said keyboard of said selected combination code to release said locking means to permit access into said safe. The electronic safe further has a display for displaying a temporary random number to be used in overriding the private combination code selected by the user, an override device for randomly generating said random number, means for encrypting said random number into an override code which will then permit access into the safe upon entry by the user of a matching override code, and means for comparing the override code entered by the user against the override code generated by said encryption means. A pull-out component is also provided for altering the encryption algorithm in the event that the security of the originally installed encryption algorithm has been breached.

Other features of the invention include improvements to the locking mechanism such as application of a higher level power output to a motor drive to initiate the locking movement of a lock bolt, followed by a lower level power output to complete the locking movement, provision of a tapered configuration on the end of the lock bolt at a more acute angle than a tapered receptacle for the lock in order to guide the movement of the bolt without sticking or jamming, and optical sensing of the position of the bolt. Preferred features of the invention also include a printed circuit board integrally mounting the electronic controls for the safe in the interior of the door, the use of a generic passkey which is inserted into a receptacle on an inner edge of the door to permit programming of the safe for a combination code selected by the user, a watchdog circuit for monitoring the operation of the microprocessor controls, and optical sensors mounted within the door for detecting the position of the lock bolt, whether the door has been closed, and whether the generic passkey has been inserted.

DESCRIPTION OF THE DRAWINGS

The above and further objects and features of the invention are described in detail below in conjunction with the drawings, of which.

DETAILED DESCRIPTION OF INVENTION

Figure 1:
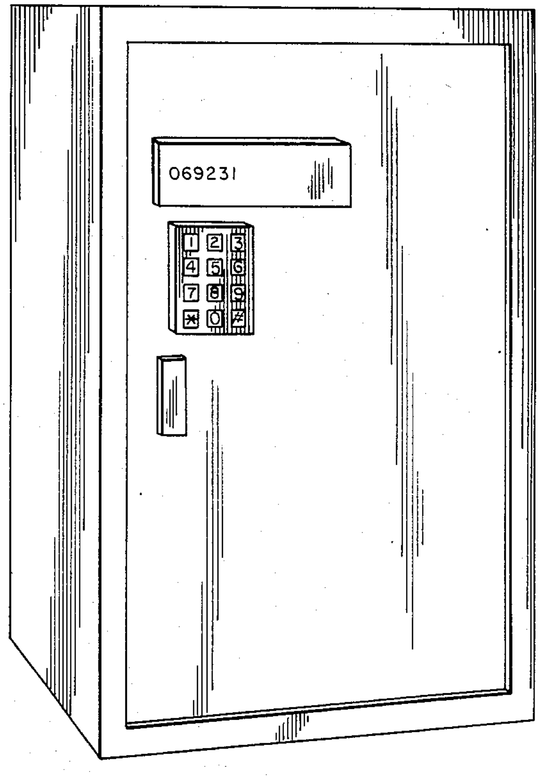
FIG. 1 is a perspective view of the exterior of an electronic safe in accordance with the invention.

It is to be understood that the following is a detailed description of one preferred embodiment of the electronic safe of the invention, and is not intended to limit the scope of the invention. Like elements referenced in the drawings are designated by the same reference numerals.

Referring to FIG. 1, a preferred form of electronic safe is shown having a secure housing 10 including a door 11 which has handle 14 and hidden hinges positioned in the interior of the safe to prevent tampering. The housing 10 and door 11 are made of high-strength metal construction to resist breaking in, and preferably the safe is bolted to the floor through a bottom plate to prevent physical removal. The safe is provided with LED numerical display 12 on the exterior of the door to provide the user visual confirmation of combination codes selected or re-entered or of the status of the electronic controls to the safe. For example, a rotating pattern of numbers can be used to indicate proper functioning, and a blank display used to indicate malfunctioning or loss of power. Keyboard 13 has ten digit keys, and a "*" key and a "#" key which are used to activate the electronic access controls, as described further below.

Figure 2:
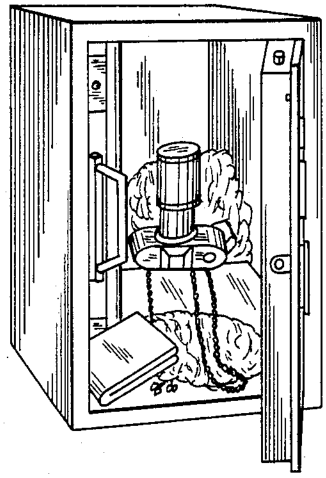
FIG. 2 is a perspective view of the interior of the safe of FIG. 1.

As shown in FIG. 2, the door 11 is locked to the door frame 15 by a motorized bolt 16 mounted within the door and movable to and from a locking position through an opening on the inner edge 19 of the door. Opening 17 is provided for an optical sensor which detects whether the door is open or closed by the reflection of the sensor light from a corresponding part of the door frame 15. A reflective surface 17*a* may be provided on the door frame part, and pulsing of the sensor light may be used to distinguish over ambient light, in order to enhance the reliability of the sensor operation. As explained further herein, the electronic controls for the safe keep the door in an unlocked condition until the user has programmed in a personal combination code and closed the door to the safe.

Figure 3:
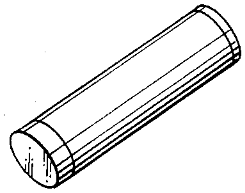
FIG. 3 is a depiction of a preferred form of generic passkey for use in initiating the programming of the electronic safe of the invention.

Receptacle 18 is provided on the inner edge 19 of the door for receiving a generic passkey 20, shown in FIG. 3, which is obtained, in one intended environment of use of the invention, from the hotel management. The passkey is preferrably in the form of a translucent cylinder portion 21 and a reflective portion 22. When the passkey 20 is inserted in receptacle 18 with its reflective end 22 forward, an optical sensor 23 at the base of receptacle 18 detects the presence of the passkey 20 and activates the electronic controls so as to initiate a sequence of programming steps by which the user inputs his or her personal combination code into an electronic memory for the safe.

Figure 4:
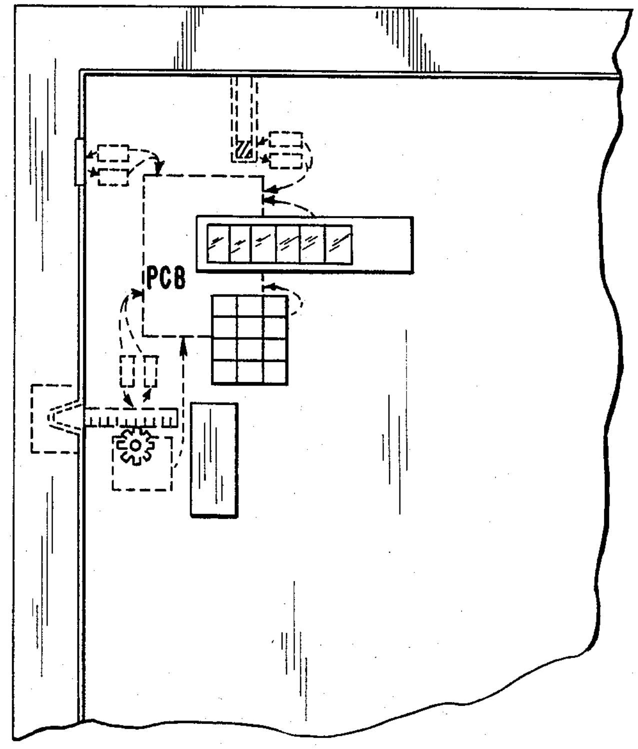
FIG. 4 is a schematic, sectional view of the electronic control unit and lock mechanism of the invention mounted in the door of the safe.

Referring to FIG. 4, the safe is designed to have a minimum of moving parts or electronic components vulnerable to tampering. For example, instead of electromechanical switches or detectors, Hall effect or optical proximity detectors are used to detect the presence of the passkey, the position of the lock bolt, and the position of the door. This will enhance reliability of operation and place the emphasis of mean time between failure (MTBF) on the bolt motor drive 27, which is consequently selected to be a high quality component. Lock bolt 16 is arranged to slide along a path terminating at receptacle 16*a* in frame 15 for locking the safe. The bolt is driven by motor 27 through gear 28 in mesh with corresponding threads or rack 29 provided on bolt 16. According to one feature of the invention, bolt 16 has a locking end 30 which is tapered at an angle more acute than the corresponding shape of receptacle 16*a*, in order to guide the bolt into its locking position and to release the bolt therefrom without jamming or sticking. Sensor 26 is provided adjacent bolt 16 for detecting the locked or unlocked position of the bolt, such as by reflection from reflective markers provided at corresponding positions thereon.

The electronic controls for the safe are preferrably mounted on one printed circuit board (PCB) 24 situated securely in the door, such as behind a protective steel plate on the front of the door. The integration of electronic control functions permits a single chip microprocessor to be used, as well as providing component cost savings and improved reliability through minimization of errors caused by noise induced by electromagnetic fluctuations. PCB 24 is positioned in proximity and connected to optical sensor 23 for the passkey 20 in receptacle 18, sensor 25 which detects whether the door is closed through opening 17, sensor 26 for detecting the position of the lock bolt 16, as well as to display 12, keyboard 13, and motor 27 for lock bolt 16.

The sequence of steps for programming the electronic safe with a personal combination code will now be described. The user first obtains the generic passkey 20 from the hotel management, such as upon checking into the hotel. With the door unlocked and open, the user inserts passkey 20 into receptacle 18, and the reflective end 22 of the passkey is detected by sensor 23. A flashing light may be provided at the base of the passkey receptacle 18 to provide visual indication that the passkey has been detected. The microprocessor is activated by detection of the passkey to cause a display of a line of dashes on LED display 12. The user can now enter in a personal combination sequence of digits through keyboard 13, which is stored in a non-volatile memory. A digit entered in error can be erased, for example, by depressing the "#" key. When the combination has been selected, the user places valuables in the safe and closes the door with the passkey still in receptacle 18. Sensor 25 detects the closed position of the door, and the electronic controls confirm the inputting of the programmed combination and the closing of the door before actuating motor 27 to drive bolt 16 to the locked position. Within a predetermined time period sufficient for the user to record the selected combination, the display is cleared. The combination will remain valid until the safe is opened and the passkey is removed and replaced to initiate a new programming sequence.

To enter the safe locked with the selected combination, the user depresses a key, such as the "*" key, and then enters the digits of the correct combination in sequence. If an error in entry is made, the digit can be erased by depressing the "#" key. When the correct combination is entered, motor 27 is actuated to unlock the safe. The user can maintain the passkey in receptacle 18 if the same combination is to be kept, or remove and reinsert the passkey to program a different combination. A safety feature may be provided wherein five incorrect combination attempts to open the safe are allowed before the electronic controls lock out any further attempts for a period of time, such as one hour, or until the combination code is overridden by an alternate code.

Figure 6:
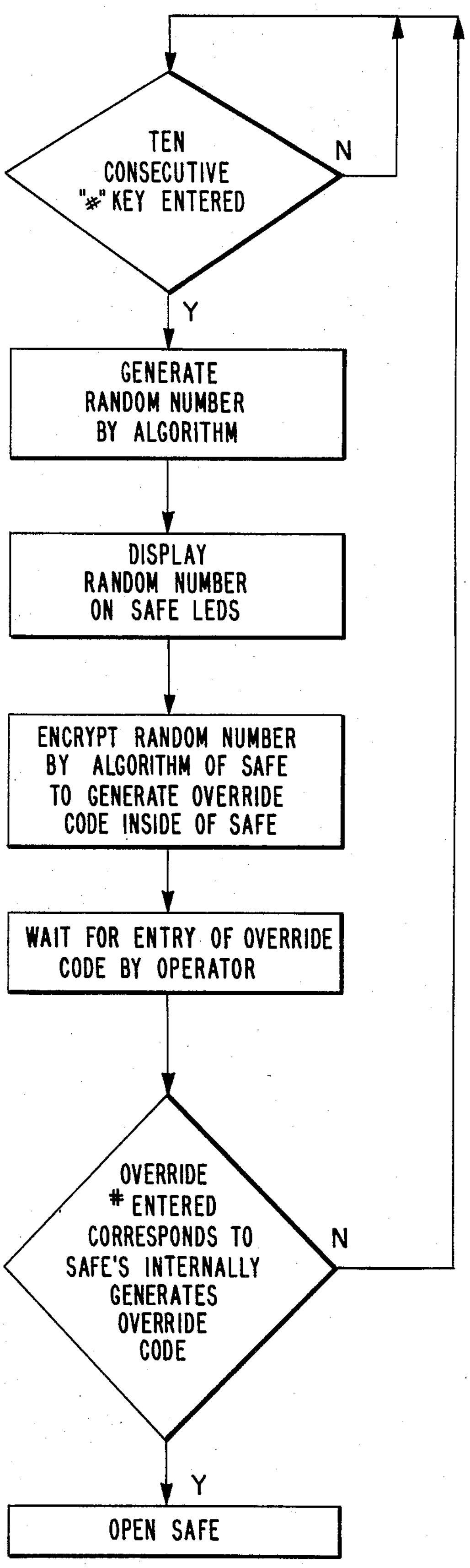
FIG. 6 is a block diagram of a program for providing override access to the electronic safe in the event the selected combination code is lost.

The electronic safe of the invention has the further feature of a secure override to bypass the privately selected combination, for example, if it is lost or forgotten. Referring to the block diagram of FIG. 6, the user presses the "#" key a consecutive number of times, e.g., ten times, and the microprocessor then generates a temporary first part code, which in the preferred embodiment is a random number generated by a stored random number generating algorithm unique to that particular safe. The user then conveys the first part code to authorized personnel such as the hotel management who enters this first-part code into a separate computer that has securely stored therein means for, or an algorithm for, converting the first-part number into an override code. One method would be to combine the first-part number with a second part number where the two in combination form an override code. In the preferred embodiment however, the first-part number is a random number. This random number is applied to an encryption device whose encryption algorithm is secured within the hotel computer. The encryption device then generates an override code which is to be used to open the safe from which the random number originated. The hotel computer can contain a look up list for the alternate codes or the algorithms of the safes used in the hotel.

The safe contains a matching encryption device. The random number generated by the safe is passed through the safe's encryption device to generate an override code which is secure within the safe. This override code is matched against the externally entered override code, and if the two match, the safe is unlocked.

The override code generated from the hotel computer's look up list or stored algorithms is dependent on the random number generated by the safe and is different each time or over a sufficiently large plurality of possible times where an override code is requested. This is particularly advantageous in that the hotel management is thereby removed from any necessity for access to the override codes, thus eliminating the possibility of unauthorized intervention by third parties. In the event the security of the primary algorithm of the safe is breached, the invention provides a pull-out component on the PCB unit for each safe which alters the primary encryption algorithm to a secondary algorithm which is also contained securely in the hotel's computer for a backup mode.

Figure 5A:
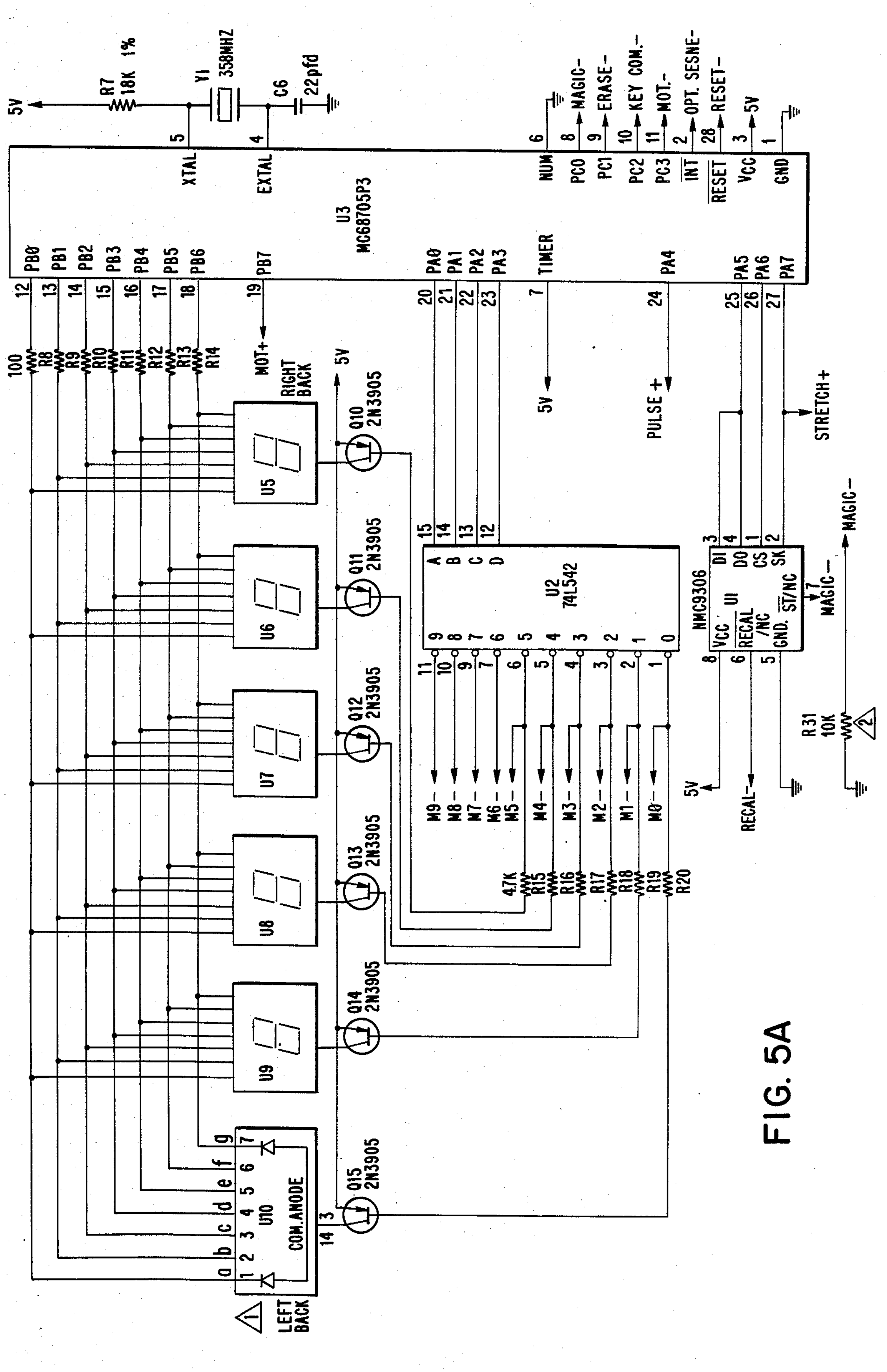
FIG. 5A is a circuit diagram of one embodiment of a display driver and microprocessor for the electronic access control.
Figure 5B:
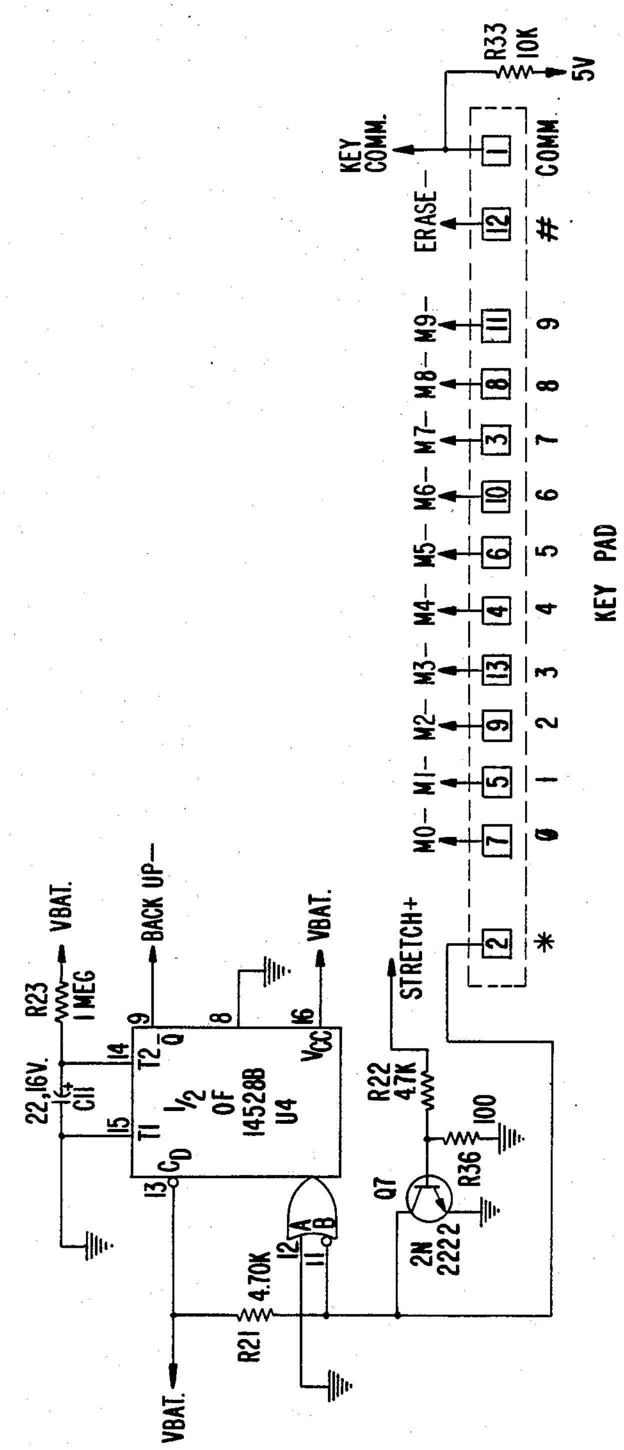
FIG. 5B is a keyboard enabling and battery backup enabling circuit.

Preferred embodiments for the electronic controls for the safe in accordance with the present invention will now be described. In FIG. 5A, a single microprocessor 31 is used to control the functions of the electronic safe, including display driver 32 and the set of LED elements U5–U10. Microprocessor 31 is also connected through display driver 32 and through leads M0–M9 to key pad 13, shown in FIG. 5B. Non-volatile RAM memory 33 is addressed through microprocessor 31 for storing and retrieving combination codes and protected data for the access and override functions of the safe. The "Magic" terminal and resistor R31 indicates the element which can be pulled out from PCB 24 to shift the alternate code generating algorithm to a secondary algorithm in the event the primary algorithm has been compromised.

Figure 5C:
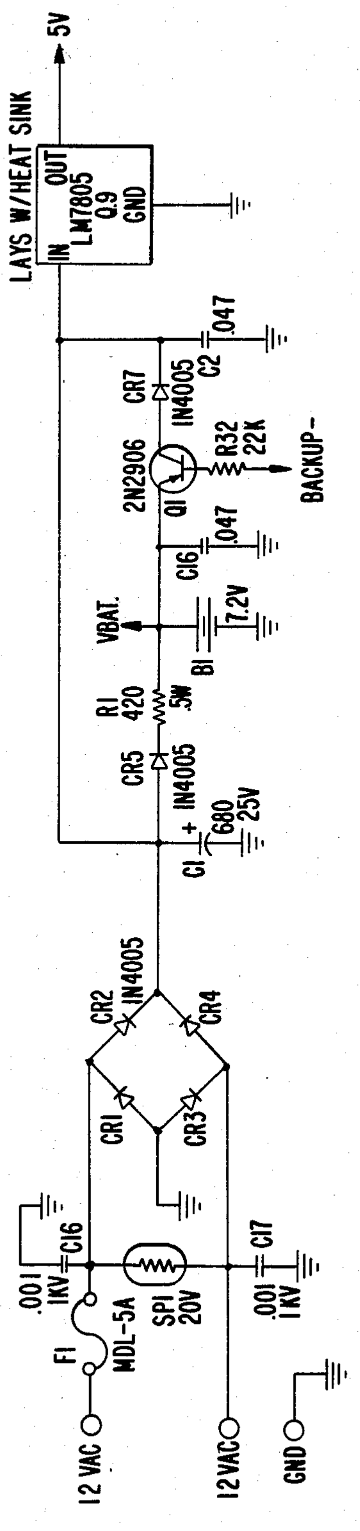
FIG. 5C is a power supply circuit.

A power supply circuit for the electronic safe is illustrated in FIG. 5C utilizing an external 110 VAC power source which is stepped down to 12 VAC for introduction to the PCB control unit. The 12 VAC power source is provided through surge arrestor SP1, rectified through bridge 34, smoothed through filter C1 and regulated to 5 VDC through voltage regulator 35. Battery backup VBAT is provided in the event of a power failure, the backup circuit including blocking diode CR5 to prevent the battery from being drained, transistor Q1 for turning on the backup power source, and diode CR7 to isolate the battery. A battery backup enabling circuit is shown at the left side of FIG. 5B which maintains the battery pickup in a dormant state, to conserve energy, until the "*" key is depressed. Logic circuit 36 activates the electronic controls to be fully functional until the safe is opened successfully. If the safe is not opened after a preset time, such as one minute, the backup circuit is deactivated in order to conserve energy.

Figure 5D:
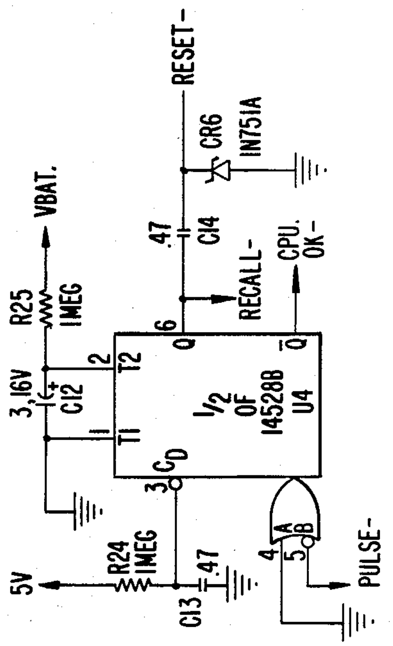
FIG. 5D is a microprocessor watchdog circuit.

In FIG. 5D a CPU watchdog circuit including logic 37 is used to initiate a set of internal tests of CPU functions upon power-up or a forced CPU restart. If a failure is detected in any of these tests, the CPU will display an error code on the LED display and shut down the safe to prevent further use. During normal operation the CPU will continuously update the watchdog circuit to ensure proper operation of the program. If an anomaly is detected, the watchdog circuit will restart the CPU and run its series of internal tests prior to resuming operation.

Figure 5E:
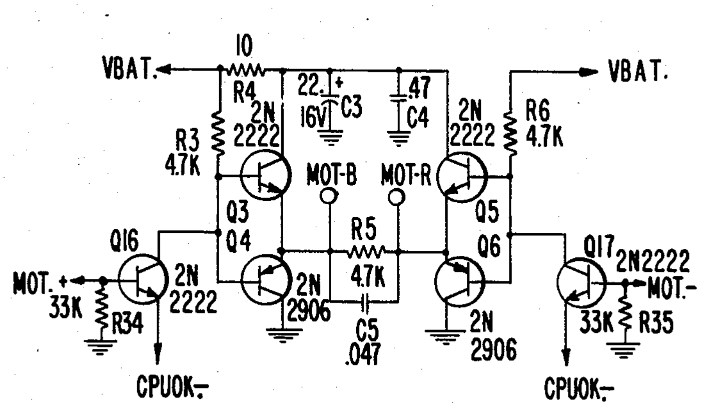
FIG. 5E is a motor drive circuit for the lock bolt.

The motor drive for the lock bolt preferrably has the safeguards against overload of reversal of the motor to return the bolt to its original position if the CPU detects an abnormal amount of travel time, and/or limiting the motor current to a safe level and stopping the motor if it is jammed. The motor drive circuit shown in FIG. 5E is able to reverse the polarity of th voltage applied to the motor. A push-pull set of NPN-PNP drivers Q3–Q6 is used, or a pair of complimentary power MOSFETs depending upon cost and performance considerations. To initiate the motor driving of the bolt, the CPU is programmed to activate a higher frequency of power output pulses for the start to overcome inertia and any sticking forces on the bolt, and a lower frequency of power pulses is ten used to complete the movement of the bolt.

Figure 5F:
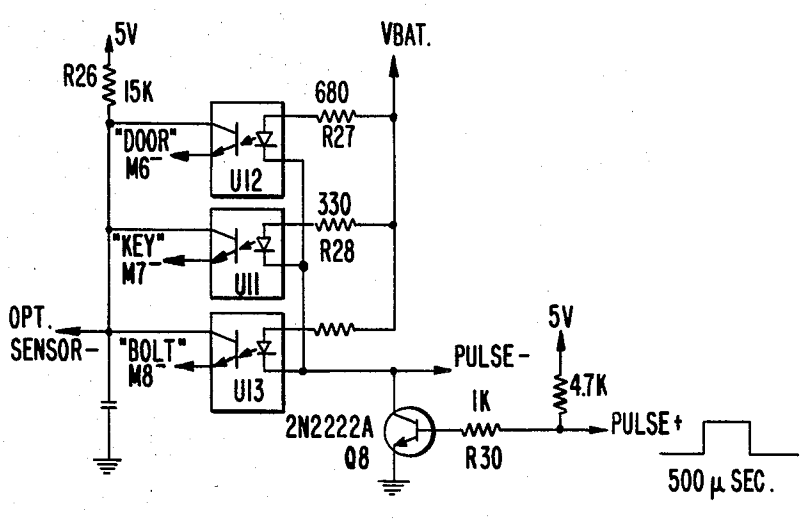
FIG. 5F is an optical sensor circuit.

The optical sensor circuit in FIG. 5F include optical sensors each having paired light emitting and sensing cells. The circuit is responsive to detection by sensor 25 of whether the door is closed, sensor 23 of whether the passkey has been inserted, or sensor 26 of the position of the bolt. The sensor light emitting cells can be pulsed in order to distinguish from receipt by the light sensing cells of ambient light.

The electronic safe in accordance with the invention is thus made simple in operation, low in manufacturing cost, and reliable in construction by using a minimum of mechanical parts and optimizing the electronic controls against failure and noise. The safe is resistant to being picked mechanically because locking and unlocking is actuated electronically through a secure combination code personal to the user. The override feature provides access in the event the combination is lost and has a secure alternate code generator and confirmation system which removes third parties from access to the correct override codes. The electronic control unit also provides for locking out the safe if an excessive number of combination tries are attempted, backup battery power in the event of power failure, monitoring the operation of the programmed functions, and improvements to the motor driving of the lock bolt.

Figure 7:
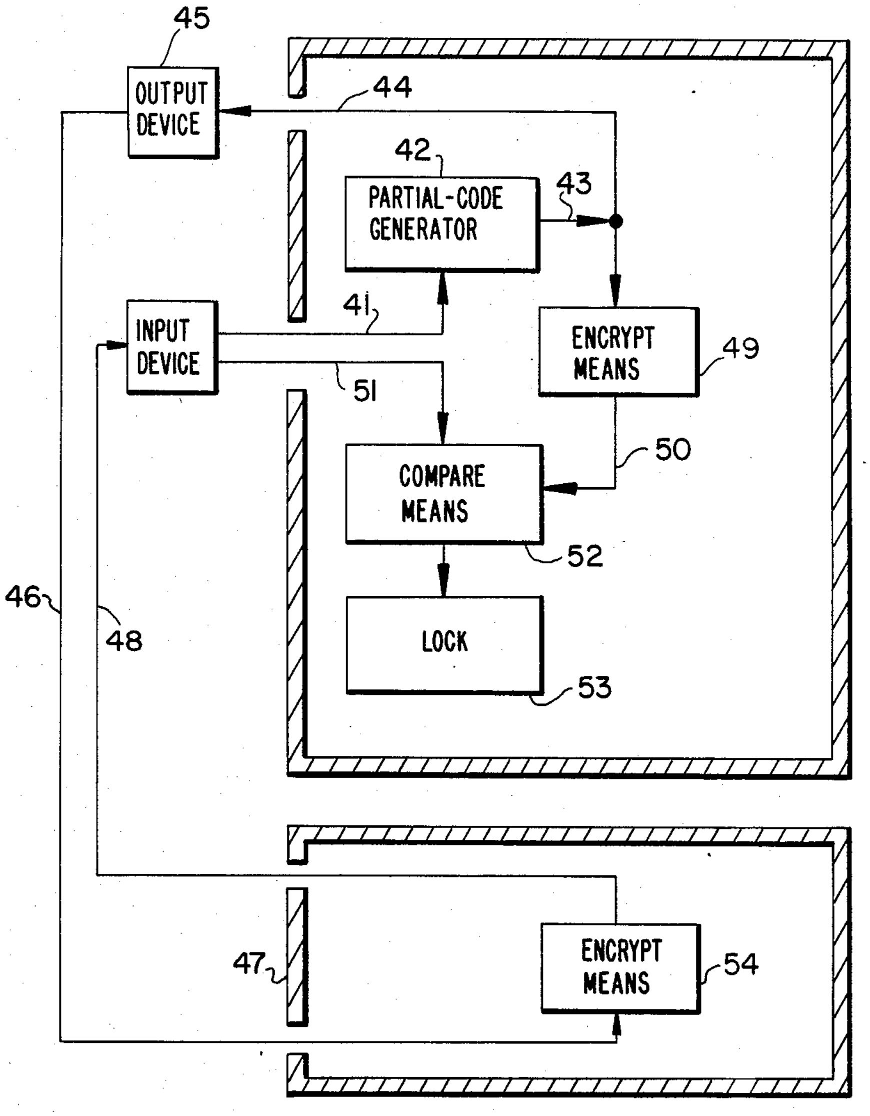
FIG. 7 is a block diagram of a by-pass operation for a lock.

With the detailed description in mind, FIG. 7, which is a general block diagram, will now be described. When the private-key access code is lost, then the user inputs a signal for initiating the bypass system (41). The partial-code generator (42) outputs a partial-code (43), which in the preferred embodiment is a random number. This partial-code is output to a user through an output coupling means (44).

An output device (45) such as a visual display device then permits an external user to access the partial-code. The partial-code is conveyed (46) to an authorized code dispenser (47) which provides the necessary override-request code (48) for unlocking the mechanism.

A partial-code convertor (49) which is securely located within the lock mechanism converts the partial-code (43) into an override code (50). When the correct override-request code is entered into the lock mechanism through an input means (51), it is compared (52) with the override-code (50) and if the two match, then the lock (53) is activated to move into its unlocked condition.

In the preferred embodiment, the code dispenser (47) is a device containing a partial-code convertor (54) which is identical to the partial-code converter (49) within the lock mechanism.

Although the above preferred embodiments have been described in detail, many other variations and modifications thereof are possible consistent with the principles of the invention. It is intended that all such variations and modifications be included within the scope of the invention as defined in the following claims.

I claim:

1. An electronic safe comprising:

a secure housing including a lockable door thereto, a programmable control unit within said housing, a main power source for actuating the functions of said safe, a keyboard mounted on an external side of said housing and connected to said control unit, means for programming a selected combination code into a memory of said control unit through said keyboard, locking means for locking said door to said housing upon programming of a combination code by a user and closing of said door to said housing, means for recognizing entry on said keyboard of said selected combination code to release said locking means to permit access into said safe, and means for overriding said selected combination code including electronic means for generating an alternate code, electronic means for deriving an override code corresponding to said alternate code, and means in said control unit for recognizing entry of said override code and unlocking the safe.

2. The electronic safe of claim 1 further comprising a display for displaying a combination code entered by the user.

3. The electronic safe of claim 1, wherein said means for generating said alternate code is a random number generator operable on a selected algorithm.

4. The electronic safe of claim 3, wherein said means for deriving an override code includes means for storing said selected algorithm of said safe and means for decoding said alternate code by said algorithm to generate said override code.

5. The electronic safe of claim 1, wherein said means for deriving an override code is external and separately operable from the safe.

6. The electronic safe of claim 1, wherein said means for overriding includes a manually removable element for altering the alternate code generating means into a secondary alternate code generating mode.

7. The electronic safe of claim 1, wherein said locking means comprises a lock bolt positioned in said door adjacent an inner edge adjacent a free end thereof, a motor drive for driving said bolt between a locked position and an unlocked position, a receptacle positioned in a frame of said housing adjacent the bolt for receiving an end of the bolt in the locked position, and means within said control unit for actuating said motor drive to lock or unlock said bolt.

8. The electronic safe of claim 7, wherein said control unit includes motor drive initiating means for applying a higher level of power output to said motor drive at the start of driving said bolt.

9. The electronic safe of claim 7, wherein the end of the bolt has a tapered configuration which is more acute than a tapered configuration of said receptacle, for guiding said bolt into and from said receptacle without jamming.

10. The electronic safe of claim 7, further comprising a first sensor connected to said control unit for detecting the position of said bolt.

11. The electronic safe of claim 1, further comprising means in said housing for receiving a passkey and intiating a programming sequence in said control unit for entry of a combination code selected by the user.

12. The electronic safe of claim 11, further comprising a second sensor for detecting receipt of said passkey, and a third sensor for detecting closing of said door of said safe, and means in said control unit responsive to said second and third sensors and to entry of a combination code on said keyboard for actuating said locking means to lock said safe.

13. The electronic safe of claim 12, wherein said control unit is mounted integrally on a printed circuit board, and said control unit, sensors, display, keyboard, and locking means are positioned in said door in proximity to each other.

14. The electronic safe of claim 12, wherein said sensors are optical sensors including light emitting cells which provide light pulses for detection over ambient light conditions.

15. The electronic safe of claim 1, further comprising monitoring means for monitoring the functions of said control unit, including means for restarting said control unit upon detection of an anomaly, and for initiating a series of internal tests prior to resuming normal operation.

16. The electronic safe of claim 1, further comprising means in said control unit for detecting a predetermined number of unsuccessful combination attempts and thereupon preventing further response to entry of a combination code for a predetermined period of time.

17. The electronic safe of claim 1, further comprising a backup battery power source, and means in said control unit for activating said battery power source in the event of failure of said main power source.

18. The electronic safe of claim 17, further comprising means in said control unit for maintaining said battery power source in a dormant state until entry of a key code indicating an operation state selected by the user, and means for returning said battery power source to a dormant state after a predetermined time period in said operation state has elapsed.

19. A lock mechanism activated electronically to an unlocked condition upon receipt of a private-key access code preselected by an authorized user of the mechanism, including data means for entering said preselected private-key access code, a locking device, and processing means for activating said locking device to its unlocked condition upon entry of said preselected private-key access code, including bypass means for activating said locking device to its unlocked condition without said preselected private-key access code, said bypass means including means for generating a partial-code, means internally within said lock mechanism for converting said partial-code to an override-code which can be derived externally of said lock mechanism from said partial code so that said locking device can be activated to its unlocked condition upon entry by said data means of said override-code.

* * * * *